United States Patent [19]
Reed et al.

[11] Patent Number: 5,833,008
[45] Date of Patent: Nov. 10, 1998

[54] EARTH AND ROOT REMOVING IMPLEMENT

[75] Inventors: Richard R. Reed, Tigard, Oreg.; Steven W. Reed, Scottsdale, Ariz.

[73] Assignee: City of Scottsdale, Scottsdale, Ariz.

[21] Appl. No.: 759,791

[22] Filed: Dec. 3, 1996

[51] Int. Cl.$^6$ .................................................. E02D 17/06
[52] U.S. Cl. ............................ 171/141; 37/302; 37/903; 37/367
[58] Field of Search .............................. 37/301, 302, 303, 37/403, 466, 404, 367, 405, 406, 407, 409, 903; 171/141, 58, 61, 62, 63, 133; 414/741, 748.1

[56] References Cited

U.S. PATENT DOCUMENTS

| | | | |
|---|---|---|---|
| 2,840,932 | 7/1958 | Breyer | 37/404 X |
| 3,039,210 | 6/1962 | Slaughter | 37/903 X |
| 3,774,686 | 11/1973 | Michener | 172/26.5 |
| 4,521,980 | 6/1985 | Solaja | 37/DIG. 3 X |
| 4,903,418 | 2/1990 | Loudon | 414/685 X |
| 5,142,799 | 9/1992 | Wood | 37/403 |
| 5,615,499 | 4/1997 | McGuire et al. | 37/367 |

*Primary Examiner*—Michael J. Carone
*Assistant Examiner*—Robert Pezzuto
*Attorney, Agent, or Firm*—Cahill, Sutton & Thomas P.L.C.

[57] ABSTRACT

An earth and root removing implement is formed from a cylindrical steel walled tube having a mouth at the front end for penetrating the earth into the root structure of a plant to be removed. To aid in penetration and permit disengaging of earth and roots received within the tube, the mouth includes an opening in the tube wall extending and tapering rearwardly to an apex. To maintain sufficient structural rigidity of the tube, the opening extends about the circumference of the tube for less than 180° and defines in combination with the front end a scoop-like configuration. Attachment devices, including slots at the rear end of the tube for receiving the blade of a bucket of a front end loader and chains extending from the bucket to the tube, mounts the implement upon the bucket. By manipulating the bucket, and hence the implement, the implement is used to dig under, loosen and pry out of the earth the roots of selected plants.

26 Claims, 2 Drawing Sheets

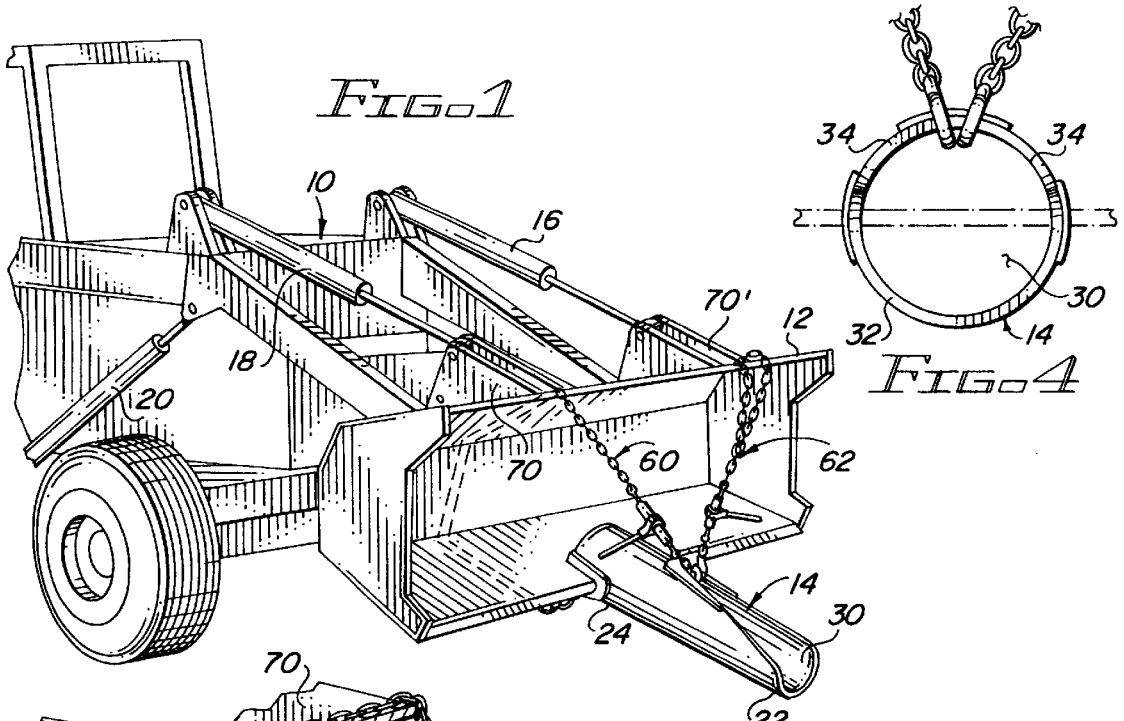
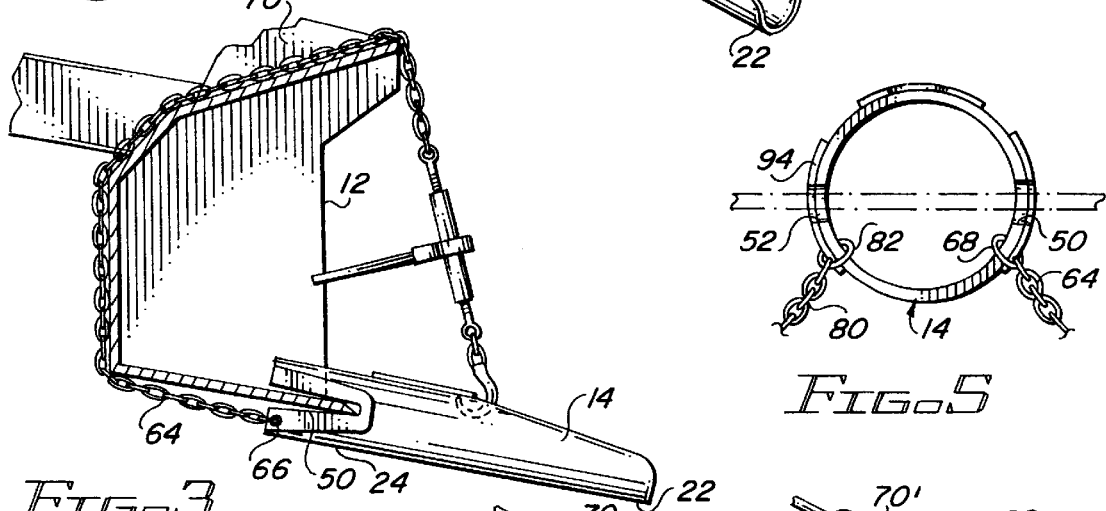
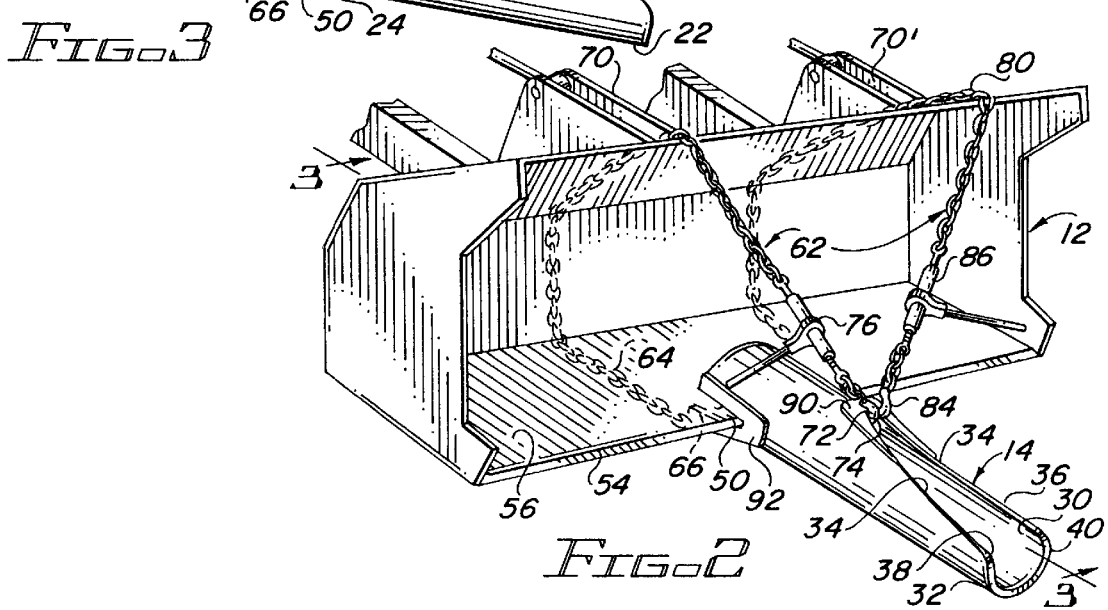

EARTH AND ROOT REMOVING IMPLEMENT

BACKGROUND OF THE INVENTION

1. Field of the Invention

The present invention relates to earth and root moving apparatus and, more particularly, to a root removing implement detachably attachable to a hydraulically operated bucket of a front end loader earth moving vehicle.

2. Description of Related Art

Plants of various types have had to be removed from the ground for eons and for any of enumerable reasons. Some of these plants can be effectively removed by severing them at ground level which kills the remaining roots. To effectively remove other plants, the root structure, and primarily the tap root, has to be removed. Conventional removal is accomplished by manually wielding a pick and a shovel. Such work is necessarily labor intensive and time-consuming. To reduce the time requirements, hydraulically operated backhoes have been used. However, the use of a backhoe imposes several restrictions, depending upon the composition of the ground. If the ground is hard or otherwise difficult to dig, conventional outriggers to stabilize the backhoe have to be put in place to prevent tipping of the vehicle and to provide a stable platform for supporting operation of the backhoe. The time required to extend and withdraw the outriggers for each plant to be removed is significant and adds to the cost of the removal as a function of time expended. Conventional hydraulically operated vehicle mounted front end loaders have been used to remove plants but the size of the attendant buckets prevents sufficient penetration of hard ground to effectively remove the root system. Moreover, the resulting size of the depression in the ground may be unacceptable because of neighboring plants that are to remain undisturbed or because of the requirement to backfill and tamp the replaced earth.

SUMMARY OF THE INVENTION

The earth and root removing implement of the present invention is preferably formed from a cylindrical steel tube, such as a 10–12 inch diameter steel well casing having a ¼ inch to ⅜ inch wall thickness. A mouth is formed by the lower half of the front end and an adjoining tapered opening formed in the wall extending rearwardly from the front end to an apex. The mouth can be likened to a scoop having a circular cross-section and a rearwardly tapering upper opening. The rear end of the implement may include a pair of opposed slots for receiving the blade of the bucket of a front end loader to position the implement upon the bucket. Each chain of a pair of chains is attached to the rear end of the implement beneath the slots. To mount the implement, the slots are brought into engagement with the blade and the chains are wrapped around the rear of the bucket and attached to the apex of the opening by ratchet style chain binders. Comealongs, turnbuckles, or other tightening devices may be used in place of the chain binders.

To remove a root after mounting of the implement upon the bucket of a front end loader, the bucket is tilted downwardly to orient the implement along a line extending through a point on the ground in front of the root ball of the plant to be removed. Translation of the implement along such line will result in penetration of the ground relatively easily due to the curved and tapering edges of the mouth of the implement. At a point where the mouth has passed the center of the root system, the bucket may be rotated and translated downwardly to reorient the implement to a generally horizontal position. The initial insertion of the implement into the ground will result in cutting of any interfering roots and the subsequent re-orientation of the implement to an essentially horizontal position will tend to raise the root ball and plant. Further raising of the bucket will result in commensurate movement of the implement and withdrawal of the plant and its roots from the ground. Where a plant with a significant and robust root system is to be removed, the implement may be driven into the ground at a plurality of locations about the plant to sever whatever roots may be present and thereafter the plant and its roots may be lifted out of the ground.

It is therefore a primary object of the present invention to provide an implement for rapidly and easily removing the roots of a plant from the ground.

Another object of the present invention is to provide an implement readily attachable to a source of power for removing the roots of a plant from the ground.

Yet another object of the present invention is to provide a tubular implement having a longitudinally elongated mouth for readily penetrating the ground adjacent and beneath a plant to be removed.

Still another object of the present invention is to provide an earth and root removing implement detachably attachable to the bucket of a front end loader.

A further object of the present invention is to provide a cylindrical tube having a longitudinally tapering mouth, which tube is detachably attachable to a motive power source for removing the roots of a plant from the ground.

A still further object of the present invention is to provide an inexpensive easily fabricated implement for removing root balls from the ground under urging from a motive power source.

A yet further object of the present invention is to provide a method for removing the roots of a plant from the ground with an implement detachably attachable to a source of motive force.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which:

FIG. 1 illustrates the earth and root removing implement mounted upon the bucket of a vehicle known as a front end loader;

FIG. 2 is a detailed view of the attachment of the implement to the bucket shown in FIG. 1;

FIG. 3 is a cross-sectional view taken along lines 3—3, as shown in FIG. 2;

FIG. 4 is a front elevational view of the implement;

FIG. 5 is a rear elevational view of the implement; and

DETAILED DESCRIPTION OF THE PREFERRED EMBODIMENT

Figure 6A:
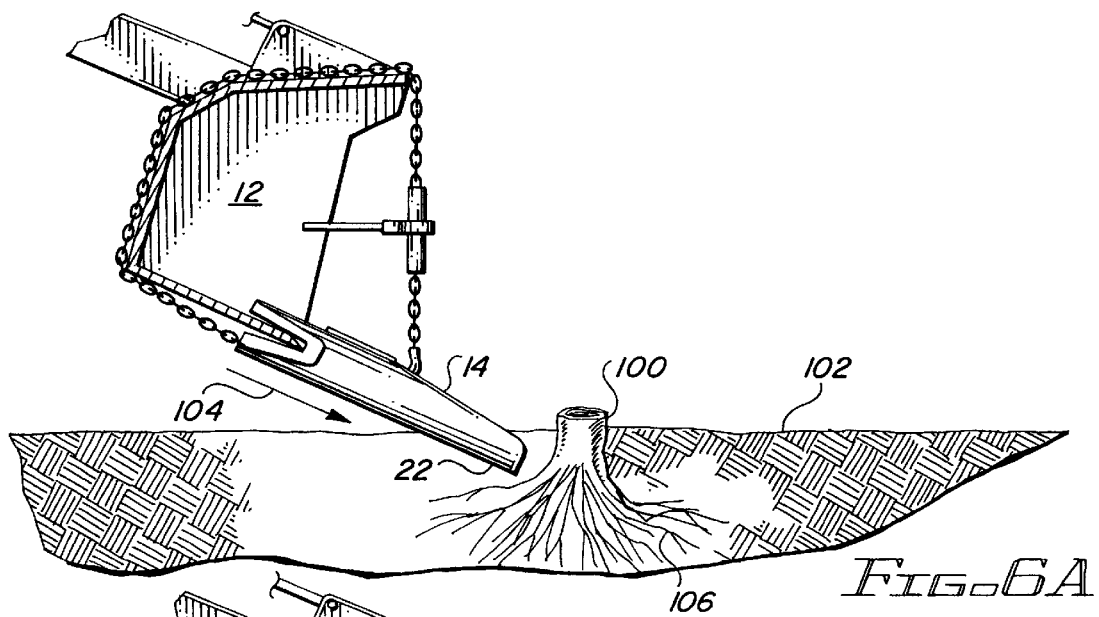
FIGS. 6A, 6B, 6C, and 6D illustrate representative steps for using the implement and supporting bucket to remove a plant and its roots from the ground.
Figure 6B:
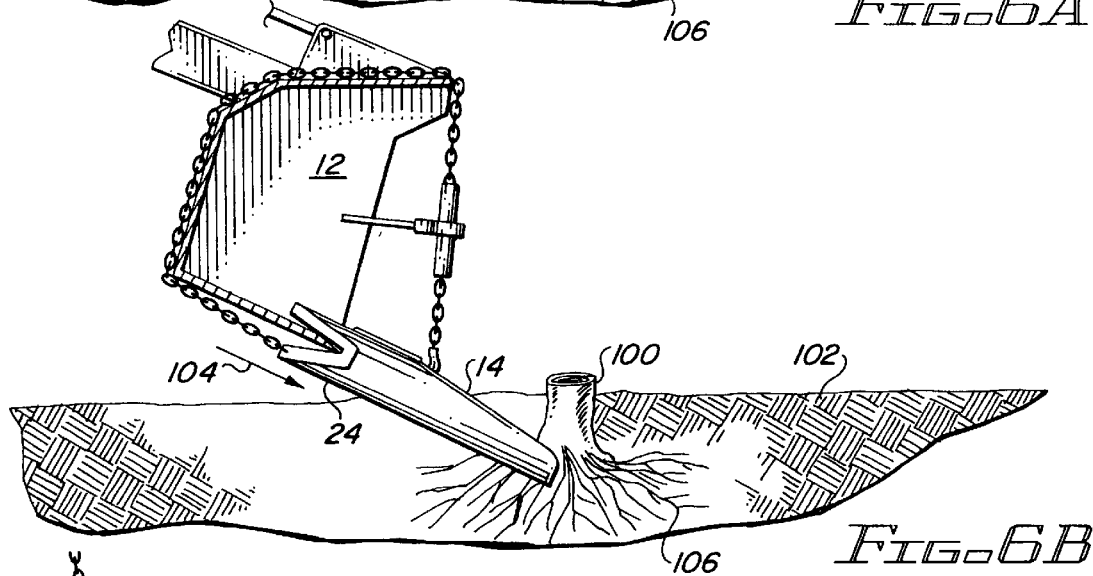

Referring to FIG. 1, there is illustrated an earth moving diesel powered vehicle having a hydraulically operated platform or bucket 12, which vehicle is usually referred to as a front end loader. Vehicles of this type are commonly found at construction sites and other locations requiring earth moving functions. In addition to its earth moving capability, bucket 12 is often used to lift and transport pieces of equipment or supplies from one location to another. An earth and root removing implement 14 is supported upon bucket 12 whereby the bucket provides a motive force for manipulating and operating the implement. Vehicle 10 is used for the purpose of transporting implement 14 to each site whereat an earth or root removal operation is to be performed. At the site, bucket 12 is manipulated by actuating an attendant hydraulic system, of which hydraulic cylinders 16, 18 and 20 are representatively shown. The vertical, angular and horizontal movement of bucket 12 is dictated by the requirements to position implement 14 to perform its function.

Referring jointly to FIGS. 2, 3, 4, and 5, further details attendant implement 14 and the attachment means deployed to secure it to bucket 12 will be described in detail. In the preferred embodiment, implement 14 is formed from a length of steel pipe, such as a 4-foot length of steel well casing with a side wall having a thickness from about ¼ inch to about ⅜ inch. It is understood that other tubular configurations could also be employed, whether square, rectangular, oval, triangular, etc. in cross-section. A mouth 30 is disposed at the front end 22 of the implement, which mouth is formed by edge 32 extending generally transversely to the longitudinal axis of the implement and an edge 34 extending rearwardly from the front end and defining a rearwardly tapering opening 36. To ensure sufficient robustness of implement 14, it is preferable that opening 36 is defined by circumferential side wall of the implement extending more than 180° about the longitudinal axis of the implement. That is, it is preferable that edge 34 of opening 36 defines an overhang. Junctions 38 and 40 between edge 32 and edges 34 are preferably rounded, as indicated in the drawings, to prevent snagging and to reduce the likelihood of stress concentrations. For additional strength and rigidity, it is preferable that edge 32 extends for more than 180° about the front end.

The rear end 24 of implement 40 is adapted to mechanically engage bucket 12. Such engagement, and the resulting structural support, is provided by a pair of slots 50,52 essentially diametrically opposed at the rear end of the implement. These slots are configured to engage blade 54 disposed at the front edge of wall 56 of bucket 12. The resulting fit is intended to provide a certain looseness for use in the field during mounting and dismounting of the implement and yet have sufficient conformity to provide structural support.

Significant loads are imposed upon implement 14 during use. These loads are accommodated to a great extent by the attachment means for maintaining implement 14 secured to bucket 12. The attachment means illustrated comprises a pair of chain assemblies 60, 62. Chain assembly 60 includes a chain 64 secured to the rear end of implement 14 by a bolt 66, as illustrated in FIGS. 2 and 3. Alternatively, a ring in engagement with the rear end of implement 14 may be used to secure chain 64, as illustrated in FIG. 5. Chain 64 is wrapped about bucket 12, preferably laterally of bracing member 70 extending about the walls and bottom of bucket 12. Chain 64 is secured to implement 14 by hook 72 engaging opening 30 at its apex 74. A comealong, turnbuckle, or other tightening device 76 is used to tighten chain 64 and reasonably rigidly secure implement 14 to bucket 12. The chain assembly also includes a chain 80 secured to the rear end of implement 14 by a bolt (like bolt 66) or by a ring 82 (as shown in FIG. 5). Chain 80 is wrapped around bucket 12 laterally outside of bracing member 70' and is secured to apex 74 by hook 84. A tightening device 86 is operated to tighten chain assembly 62 and to retain implement 14 in place. The forces imposed by chain assemblies 60 and 62 tend to draw implement 14 toward bucket 12 to securely lodge blade 54 within slots 50, 52 and the slots, in combination with the tension imposed by chains 64, 80, extending from rear end 24, resist upward angulation of the implement. The lateral displacement of chains 64, 80 of chain assembly 60, 62, respectively, limit the amount of lateral angular movement of the implement. Thus, the implement is maintained firmly, but not rigidly, in place to accommodate unexpected rocks in the ground or other immovable elements that may be encountered during operation.

As may be surmised, significant loads may be imposed upon implement 14 during operation. To prevent such loads from deforming the implement at high stress points, a doubler 90 may be welded about apex 74 to prevent deformation or tearing of the adjacent side wall of the implement. Moreover, a doubler 92 may be used about slot 50 to resist the bending loads imposed upon the implement. Doubler 90 may extend circumferentially a sufficient degree to provide support for either bolt 66 or ring 68, whichever is used to secure chain 64. A further doubler 94 is used in conjunction with slot 52 to provide additional support in the area of the slot and for the bolt or ring 82 securing chain 80.

Figure 6C:
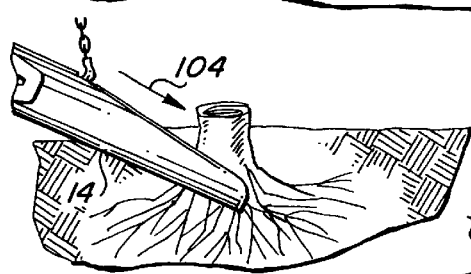
Figure 6D:
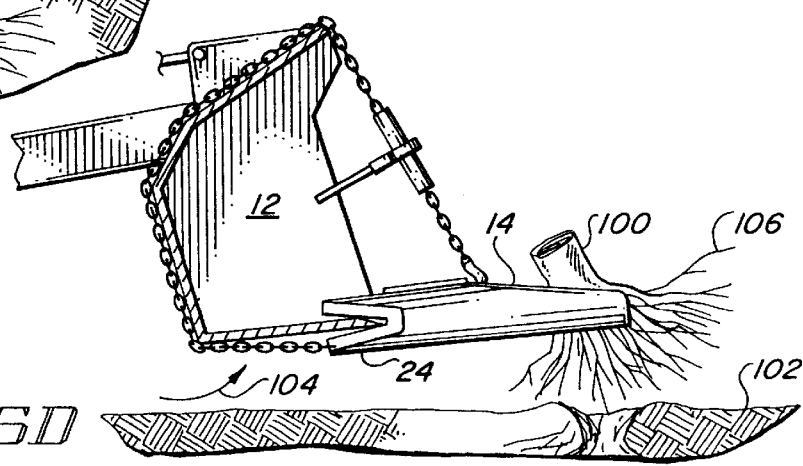

Referring jointly to FIGS. 6A, 6B, 6C, and 6D, the fundamental steps of operation will be described. A plant 100, which may be a bush, a shrub, or a tree 100 (as shown) is to be removed with at least a significant part of its roots from ground 102. To effect removal, bucket 12 is positioned and angularly oriented to align the longitudinal axis of implement 14 with a line (as represented by arrow 104) extending into the ground and approximately beneath root ball 106 of plant 100. Translation of bucket 12 along a line represented by arrow 104 will result in penetration of implement 14 into the ground and into contacting and severing relationship with the roots of root ball 106. The extent and depth to which the implement is translated is a function of the size of plant 100 and the anticipated accompanying root ball configuration. For example, for plants having a tap root that must be severed, sufficient translation of the implement must be effected to perform such severing function. Upon penetration of implement 14 into the ground, the adjacent earth will slide into the mouth of the implement along with the severed part of plant 100 and root ball 106, as represented in FIG. 6C. Thereafter, bucket 12 is lowered and angularly reoriented to bring implement 14 into a generally horizontal alignment. Further translation of the implement may be necessary when it is in its horizontal alignment to ensure effective severing of the attendant root ball. Once an operator is certain that the major roots of the plant have been essentially severed, bucket 12 is raised which raises implement 14. As the plant and associated severed root ball has essentially become lodged within the opening of the mouth of the implement, as depicted in FIG. 6D, the plant is lifted, or torn, out of the ground. Thereafter, it may be deposited on the ground for subsequent removal.

It may be noted that because implement 14 is open ended at both ends, except for the impediment created by blade 54 extending transversely thereacross, the earth collected can readily translate rearwardly through the implement. Moreover, the use of opening 36 permits reception of the planted root ball and accompanying earth to ensure effective lifting of the plant during exercise of the removing step depicted in FIG. 6D. Moreover, any earth remaining within the implement after deposit of the uprooted plant, can be easily shaken out from within the implement and induced by rapid movement of bucket 12.

After the plants to be removed have been removed, implement 14 is readily disengaged from bucket 12. Such dismounting is accomplished by loosening tightening devices 76 and 86. Such loosening permits unhooking of hooks 72,84 from engagement with apex 74. Thereafter, the chains may be unwrapped from about bucket 12. By drawing implement 14 away from bucket 12, the slots disengage from blade 54. The implement may then be stored for future use at a convenient location. It may be noted that the structure of bucket 12 need not be modified to either mount, support or dismount implement 14. Thus, its conventional use is not affected to any extent by the mounting of implement 14 thereupon. Accordingly, implement 14 may be used with any standard configured bucket 12 or, for that matter, with any other element that can serve as a motive force for manipulating the implement to remove plants.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention.

What is claimed is:

1. An earth and root removing implement for mounting upon a blade of a bucket of a motorized earth moving vehicle, said implement comprising in combination:

(a) a tube having a front end and a rear end;
    (b) a pair of slots disposed in the rear end of said tube for receiving the blade of the bucket to support said tube upon the bucket;
    (c) a mouth formed in the front end of said tube and including a rearwardly extending opening defining an apex at the rear end of said opening; and
    (d) a pair of anchoring devices for securing said tube to the bucket, each anchoring device of said pair of anchoring devices being attachable at the rear end of said tube, extendible about the bucket and attachable to said tube.

2. The implement as set forth in claim 1 wherein each anchoring device of said pair of anchoring devices is fixedly attached to the rear end of said tube and also removably attached to said tube to permit mounting and dismounting of said tube upon the bucket.

3. The implement as set forth in claim 2 wherein each anchoring device of said pair of anchoring devices includes adjustment means for tightening and loosening said anchoring device about the bucket.

4. The implement as set forth in claim 3 wherein each anchoring device of said pair of anchoring devices includes a hook for engaging said tube at said apex.

5. The implement as set forth in claim 2 wherein said pair of anchoring devices comprises a pair of chains.

6. The implement as set forth in claim 1 wherein said tube is cylindrical.

7. The implement as set forth in claim 6 wherein said opening is disposed within less than one-half of the circumferential area of said tube.

8. The implement as set forth in claim 6 wherein said tube is open ended to permit discharge of earth from both of the front and rear ends of said tube.

9. The implement as set forth in claim 6 wherein said opening tapers rearwardly to said apex.

10. The implement as set forth in claim 1 wherein said tube includes a cylindrically shaped wall and wherein a segment of said wall substantially defining said opening extends for at least 180° about the longitudinal axis of said cylindrical tube.

11. The implement as set forth in claim 10 wherein the thickness of said wall is in the range of about ¼ inch to about ⅜ inch.

12. The implement as set forth in claim 11 wherein said wall is of steel.

13. The implement as set forth in claim 1 wherein said tube is formed from a length of a steel pipe.

14. The implement as set forth in claim 1 wherein said pair of slots are reinforced with doublers.

15. The implement as set forth in claim 1 wherein at least said apex is reinforced with a doubler.

16. The implement as set forth in claim 1 wherein the rear end of said tube includes points of attachment for said pair of anchoring devices and at least a doubler for reinforcing said points of attachment.

17. A plant removing implement for mounting upon a bucket of a motorized earth moving vehicle, said implement comprising in combination:

(a) a tube having a front end and a rear end;
    (b) a mouth formed in said implement for penetrating the earth, said mouth being defined by the front end of said tube and an opening in the wall of said tube extending rearwardly from the front end; and
    (c) attachment means disposed at least at the rear end of said tube for securing said implement to the bucket of the earth moving vehicle.

18. The implement as set forth in claim 17 wherein said tube is formed by an essentially cylindrically shaped wall.

19. The implement as set forth in claim 18 wherein a segment of said cylindrically shaped wall defining said opening is at least 180° of the circumference of said tube.

20. The implement as set forth in claim 17 wherein said opening is rearwardly tapered to an apex.

21. The implement as set forth in claim 20 wherein said attachment means includes engaging means interconnecting said apex and the rear end of said tube with the bucket to attach said implement to the bucket.

22. The implement as set forth in claim 21 including doublers disposed at said apex and at said rear end for supporting said attachment means.

23. A method for removing roots of a plant with a root removing implement detachably attachable to a bucket of an earth moving vehicle, said method comprising:

(a) attaching the rear end of the implement to the bucket;
    (b) manipulating the bucket to urge the front end of the implement into the ground proximate the roots to be removed;
    (c) said manipulating step including the step of cutting the roots with a mouth having edges at the front end of the implement for cutting the roots, which mouth is defined by an opening extending from the front end and tapering rearwardly to an apex and including the step of forcing the plant and cut roots into the mouth of the implement and raising the plant and cut roots out of the ground; and
    (d) said attaching step including the step of interconnecting a part of the implement at a location forwardly of the rear end with the bucket to reduce play between the implement and the bucket as a result of the forces imposed during exercise of said manipulating step.

24. The method as set forth in claim 23 wherein said interconnecting step includes the step of interconnecting the apex with the bucket.

25. The method as set forth in claim 23 wherein said attaching step includes the step of inserting a part of the bucket into slots at the rear end of the implement.

26. The method as set forth in claim 23 including the step of detaching the implement from the bucket on completion of said manipulating step.

* * * * *